Jan. 23, 1934.  R. BERINGER  1,944,149
FRICTION AND POSITIVE CLUTCH MECHANISM
Filed Aug. 16, 1928
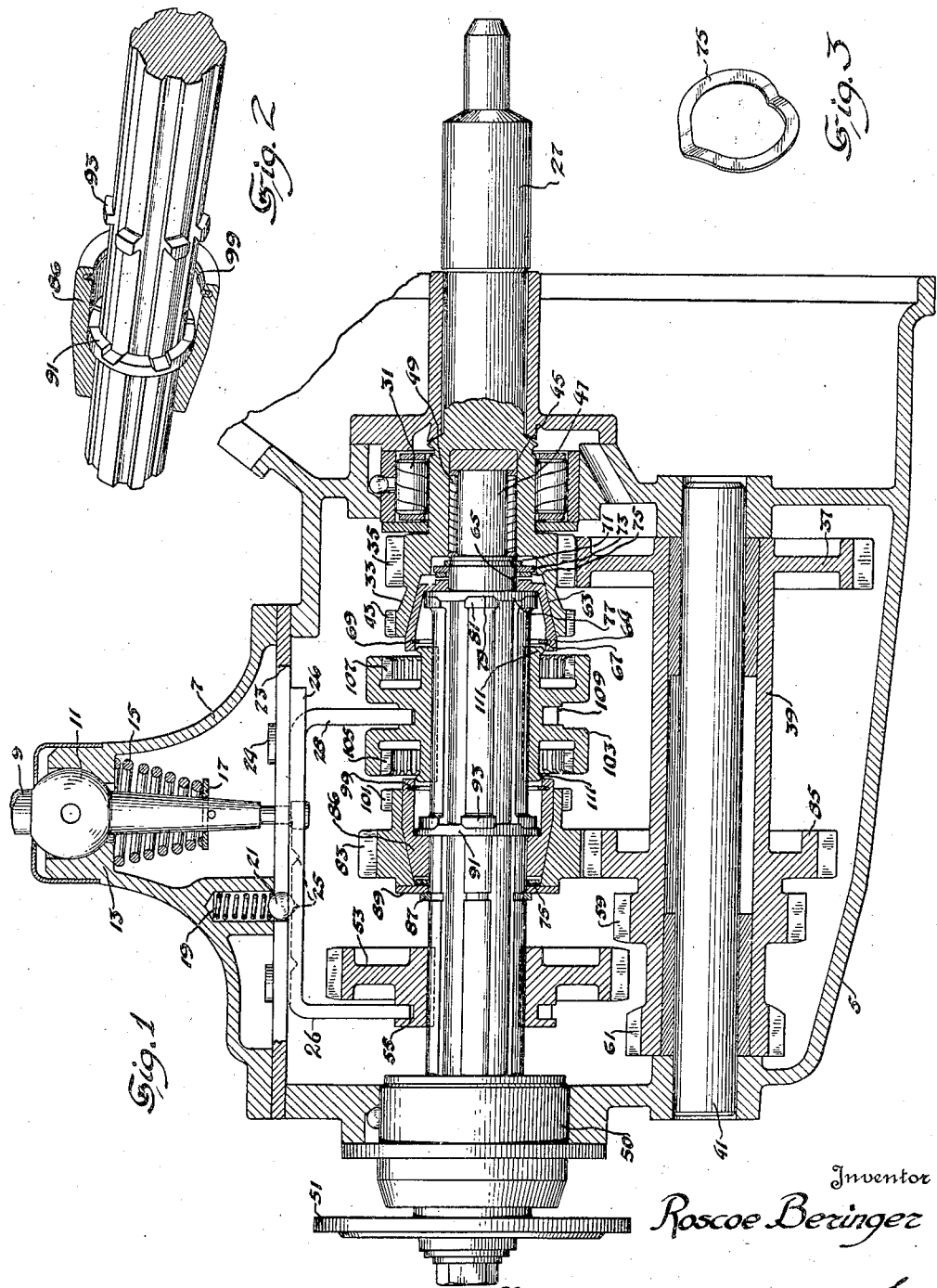
Inventor
Roscoe Beringer
By Blackmore, Spencer & Flint
Attorneys Patented Jan. 23, 1934

UNITED STATES PATENT OFFICE 1,944,149

1,944,149

FRICTION AND POSITIVE CLUTCH MECHANISM

Roscoe Beringer, Detroit, Mich., assignor to General Motors Corporation, Detroit, Mich., a corporation of Delaware Application August 16, 1928. Serial No. 299,961

5 Claims. (Cl. 192—53)

This invention relates to power transmission mechanism, and has been designed as an improvement in change speed mechanism as used on motor vehicles.

An object of the invention is to render shifting quick, easy and noiseless. As a further object, the invention makes use of constantly meshing gears and sequential acting friction clutch mechanism and tooth clutch mechanism to render such gearing operative. The friction clutch mechanism is intended to effect a synchronization prior to the engagement of the teeth of the tooth clutch.

An embodiment of the invention is illustrated in the accompanying drawing. In this drawing:

Figure 1 is a longitudinal section through the transmission;

Figure 2 is a perspective of a part of the spline shaft, one of the synchronizing elements being shown thereon; and Figure 3 is a perspective of a detail.

Referring by reference characters to the drawing, numeral 5 represents the housing for the transmission gearing, its cover being represented by numeral 7. In the upper part of the cover is mounted the usual gear shift lever 9 for changing the speed ratios between the driving and driven shafts within the transmission. The ball portion 11 is held on its socket 13 by a spring 15 in abutment with the underside of the socket and a part 17 fixedly carried by the lever. The cover is also bored out to receive a spring 19 pressing upon a ball 21. This ball is located within an opening in a plate 23 mounted between the casing and cover. It enters notches 25 in the sliding forks to function as an interlock and a detent in a well-known way. No novelty is alleged for this construction and it need not be more fully described. There are two sliding forks 26 and 28. These forks are substantially right angular in shape. Their upper surfaces slide on plate 23, being guided by studs 24 carried thereby and extending through slots in plate 23. The lower ends of the forks engage collars on the sliding gears, as is usual.

Entering the front end of the transmission casing is a power shaft 27 rotated by the motor of the vehicle through the instrumentality of the clutch, as usual. This shaft is rotatably mounted in the front wall by roller bearings 31. Its end within the roller bearings is enlarged, as at 33, where it is formed with external teeth 35 which are in driving engagement with the gear 37 on the countershaft 39. The countershaft is rotatably mounted on a fixed shaft 41 carried by the walls of the gear casing. The extreme inner end of the power shaft has external clutch teeth 43. At its inner end the power shaft is internally bored out, there being an inner bore 45 to receive the extreme reduced end of the driven transmission shaft or spline shaft 47. Roller bearings 49 are used as shown.

The rear wall of the transmission casing has bearings 50 for the spline shaft, which shaft, at its rear end, is provided with means 51 for attachment to the propeller shaft extending to the rear axle.

Slidably mounted on the spline shaft is a sliding gear 53 having a collar 55 for engagement by fork 26. The gear 53 is movable into engagement with low speed gear 59 of the countershaft and it is also movable into engagement with a reverse idler, not shown, which is rotated by a reverse driving gear 61 also on the countershaft.

The novel structure for direct and second speed will now be described. The extreme inner end of the driving or power shaft has a tapered opening 63, within which is a conical cup 64 slidable on the driven shaft, as shown by numeral 65. The conical cup may be pushed forward to frictionally engage the tapered power shaft, as will be readily understood from the drawing. At the larger end of the conical cup is an annular groove 67, within which is a ring shaped spring 69 normally projected into the cup but capable of being pushed radially outward into the groove. On the driving shaft near the roller bearing 49 is an abutment ring 71 holding a thrust ring 73. Between the thrust ring and the end of the conical cup is an annular spring member 75 shaped substantially as shown in Figure 3. The waved form of this spring is capable of being flattened out when the conical cup is pressed within the tapered end of the driving shaft. Pressed into the conical cup is a ring 77 having recesses 79 to engage lugs 81 on the spline shaft. The engaging surfaces of the lugs and recesses are beveled so that if the tapered cone is pushed into the recess of the driving shaft and if, at the same time, there exists a relative rotation between the tapered cone and the driving shaft, the engaging surfaces have a cam action tending to increase the frictional hold between these engaging parts. The driving shaft and the spline shaft are therefore quickly synchronized.

At 83 is a second speed driven gear. It is in constant driving engagement with the second speed driving gear 85 on the countershaft, in this respect not differing from the conventional construction. Internally, gear 83 is provided with a tapered recess, substantially like the tapered recess within the driving shaft. Within this tapered recess is a conical cup 86 like the conical cup 64 within the recess of the driving shaft. On the spline shaft is a retaining ring 87 and a thrust ring 89 with which the gear 83 is in abutment. Within the gear 83 is an annular spring ring, like that shown in Figure 3, tending normally to relieve the frictional engagement between the conical cup 86 and the recess of gear 83. At 91 is a ring, like ring 77 and similarly pressed into the conical cup. This ring 91 is, like the other, provided with recesses having beveled edges to engage the beveled edge lugs 93 on the spline shaft. Adjacent the opening of the cone is a yielding spring ring 99, as in the case of the other cone. This yielding spring ring projects within the opening of the conical cup but may be pressed outwardly into a groove of the cup, as clearly illustrated. The gear 83 forwardly with reference to its gear teeth has clutch teeth 101.

Slidably splined on the spline shaft between the relatively large open ends of the two conical cups is a movable clutch member 103. This clutch member has opposed internal clutch teeth 105 and 107. The teeth 105 are intended to engage teeth 101 and teeth 107 are intended to engage teeth 43 upon the proper movement of the splined double clutch member. The collar for sliding this member is between the two clutch rings and is designated by numeral 109, the clutch fork being the fork 28. The opposed extremities of the hub of the double clutch member 103 are provided with radial enlargements 111 to engage the spring members 99 and 69, depending upon the direction of movement of the clutch member. These springs offer more resistance than springs 75 and permit the conical member to be pushed into the recess of the gear member, the springs 75 yielding and acquiring a tension sufficient to push back the cone out of frictional engagement when permitted to do so. In so operating, the bevel surfaces of the lugs and recesses engage owing to the relative rotation of the parts and operate as a self-energizing means to force the frictional surfaces more tightly together. Further movement of the movable clutch member causes the radial projections 111 to pass by the spring members 99 and 69, as the case may be, whereupon the spring 75 is free to loosen the engagement between the conical member and the tapered recess of the driving shaft 27 or of the gear 83. This release does not occur, however, until the shafts have been synchronized by the action of the frictional clutch. Thereupon, the positive clutch teeth may freely engage, the teeth 105 engaging with teeth 101 or the teeth 107 engaging with teeth 43.

The above described gear change mechanism insures quiet shifting. It makes use of sequential clutches, a friction clutch and a positive clutch for both third and intermediate speeds. In each case, the frictional clutch insures synchronization prior to the engagement of the tooth clutch. A similar provision could obviously be used for the low and reverse transmission drives should it be so desired, but low and reverse are used so rarely that it is believed to be unnecessary to provide this refinement for the low speed and reverse driving ratios.

I claim:

1. In power transmission mechanism, a shaft; a composite frictional and positive clutch coaxial with the shaft, a positive clutch component consisting of a jaw clutch element capable of rotation with respect to the shaft, but restrained from axial movement, and a companion element slidably keyed to the shaft, said companion element having a central hub portion embracing the shaft and jaws disposed radially outward of said hub portion in position to interlock with the jaws of the element restrained from axial movement; the frictional clutch component consisting of a cone surfaced element fixed to the jaw clutch element that is restrained from axial movement, and a companion axially movable cone clutch element, having driving connection with the shaft, interposed between the elements of the jaw clutch component, and an opening therein arranged to remove obstruction to the advance of the slidable jaw clutch element toward its companion; an elastic device interposed between the axially movable friction clutch element and the hub of the slidable jaw clutch element, said elastic device having a positive engagement in an axial direction with one of these elements and arranged to engage frictionally the other during movement of the slidable jaw clutch element toward its companion.

2. In power transmission mechanism, a composite frictional and positive clutch as defined in claim 1 in which the shaft is provided with beveled surfaces and the axially movable friction clutch element with cooperating beveled surfaces adapted upon initial engagement of the cone surfaces of the frictional elements effected through the elastic device to increase the pressure on the axially movable frictional clutch element.

3. In power transmitting mechanism, a shaft; a composite frictional and positive clutch coaxial with the shaft, the positive clutch component consisting of a jaw clutch element capable of rotation with respect to the shaft but restrained from axial movement, and a companion element slidably keyed to the shaft; said jaw clutch element that is restrained from axial movement having a cavity, opening toward the slidable jaw clutch element, and an external annular row of clutch jaws; said slidable jaw clutch element having a central projecting hub portion adapted to enter the cavity of its companion and an annular row of internal clutch jaws radially spaced from said projecting hub and adapted to interlock with said external clutch jaws; the frictional clutch component consisting of an internal cone element formed within the cavity of the jaw clutch element that is restrained from axial movement, and a companion axially movable external cone clutch element, having driving connection with the shaft, interposed between the elements of the jaw clutch component; an elastic device interposed between the axially movable friction clutch element and the hub of the slidable jaw clutch element, said elastic device having a positive engagement in an axial direction with the friction clutch element and arranged to engage fritionally the hub of the slidable jaw clutch element during movement of the latter toward its companion.

4. In power transmission mechanism a composite frictional and positive clutch as defined in claim 3 in which the shaft is provided with beveled surfaces and the axially movable cone clutch element is cup-shaped and provided with a ring, having beveled projections, secured in the cavity of the cup-shaped element, said beveled projections arranged to cooperate with the beveled surfaces on the shaft.

5. In power transmission mechanism, a composite frictional and positive clutch as defined in claim 3, in which the hub of the slidable jaw clutch element is equipped with radial projeting means adapted to engage the elastic device to move the slidable friction clutch element into contact with its companion and to pass by said device and permit free engagement of the jaw clutch elements.

ROSCOE BERINGER.